(12) United States Patent
Kim

(10) Patent No.: US 12,511,955 B2
(45) Date of Patent: Dec. 30, 2025

(54) APPARATUS AND METHOD FOR DETECTING CURRENT CONCENTRATION IN REDUNDANT SYSTEM

(71) Applicant: HL Mando Corporation, Pyeongtaek-si (KR)

(72) Inventor: Doyoung Kim, Suwon-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 208 days.

(21) Appl. No.: 18/226,974

(22) Filed: Jul. 27, 2023

(65) Prior Publication Data
US 2024/0395082 A1   Nov. 28, 2024

(30) Foreign Application Priority Data
May 22, 2023  (KR) .................. 10-2023-0065503

(51) Int. Cl.
G07C 5/08    (2006.01)
G01R 19/10   (2006.01)

(52) U.S. Cl.
CPC .......... G07C 5/0808 (2013.01); G01R 19/10 (2013.01); G07C 5/085 (2013.01)

(58) Field of Classification Search
None
See application file for complete search history.

(56) References Cited

U.S. PATENT DOCUMENTS 4,540,939 A * 9/1985 Osborne .................. H02H 3/28
                                               361/87

FOREIGN PATENT DOCUMENTS

| KR | 101878403 B1 * | 3/2015 |
| KR | 10-2015-0108277 A | 9/2015 |
| KR | 101662406 B1 * | 10/2016 |
| KR | 20200110956 A * | 9/2020 |

OTHER PUBLICATIONS

Office Action dated Mar. 24, 2025 for corresponding Korean Patent Application No. 10-2023-0065503, along with an English machine translation (15 pages).

* cited by examiner

*Primary Examiner* — Abdhesh K Jha
(74) *Attorney, Agent, or Firm* — Hauptman Ham, LLP

(57) ABSTRACT

An apparatus and method for detecting current concentration of a redundant system according to preferred example embodiments of the present disclosure may minimize occurrence of failures in a redundant system including two electronic control units (ECUs) using a common ground by detecting current concentration generated in the redundant system using a current sensor disposed on the common ground.

16 Claims, 4 Drawing Sheets

APPARATUS AND METHOD FOR DETECTING CURRENT CONCENTRATION IN REDUNDANT SYSTEM

CROSS-REFERENCE TO RELATED APPLICATION

This application claims priority to and the benefit of Korean Patent Application No. 10-2023-0065503 filed on May 22, 2023, in the Korean Intellectual Property Office, the entire disclosure of which is incorporated herein by reference for all purposes.

TECHNICAL FIELD

The present disclosure relates to an apparatus and method for detecting current concentration in a redundant system, and more particularly, to an apparatus and method for detecting current concentration generated in a redundant system.

BACKGROUND

In recent electronic control units (ECUs), two ECUs are designed on one printed circuit board (PCB) to secure fault redundancy. When the same ground pattern is used, the same current is used in normal cases, whereas when current concentration of a PCB pattern occurs, an abnormality in control occurs or use of overcurrent in one pattern is induced.

SUMMARY

An object to be achieved by the present disclosure is to provide an apparatus and method for detecting current concentration in a redundant system, for detecting current concentration generated in a redundant system using a current sensor mounted on the redundant system including two electronic control units (ECUs) using a common ground and disposed on the common ground.

Other objects of the present disclosure not specified may be additionally considered within the scope that may be easily inferred from the following detailed description and effects thereof.

An apparatus for detecting current concentration of a redundant system according to a preferred example embodiment of the present disclosure for achieving the above technical object is an apparatus for detecting current concentration of a redundant system including: two electronic control units (ECUs) using a common ground; and a detection circuit including a current sensor disposed on the common ground and configured to detect current concentration based on a first current sensed through the current sensor.

Here, the detection circuit may be configured to detect current concentration based on the first current and a second current input from a battery to one ECU of the two ECUs.

Here, the detection circuit may be configured to detect the current concentration based on a ratio of the second current to the first current.

Here, the detection circuit may be configured to determine whether current concentration occurs by comparing a sensed value which is an absolute value of a value obtained by dividing the first current by the second current with a preset reference value.

Here, the detection circuit may be configured to determine that current concentration occurs when the sensed value is greater than the reference value, and determine that current concentration does not occur when the sensed value is less than the reference value.

Here, the detection circuit may be configured to, when it is determined that current concentration occurs, detect which ECU of the two ECUs is subjected to the current concentration based on a sign of the first current.

Here, the detection circuit may be configured to detect the current concentration based on the second current and the first current only when a current flowing in the redundant system is greater than or equal to a preset reference current.

Here, the detection circuit may be configured to, when it is determined that current concentration occurs, request a control output down of the redundant system to a central ECU of a vehicle equipped with the redundant system.

Here, the detection circuit may be configured to, when it is determined that current concentration occurs, record a diagnostic trouble code (DTC) in a vehicle equipped with the redundant system.

Here, the current sensor may include a resistor.

A method for detecting current concentration of a redundant system according to a preferred example embodiment of the present disclosure for achieving the above technical object is a method for detecting current concentration of a redundant system including: two electronic control units (ECUs) using a common ground and a detection circuit, including sensing, by the detection circuit, a first current through a current sensor disposed on the common ground; and detecting, by the detection circuit, current concentration based on the first current.

Here, the detecting of the current concentration may include detecting current concentration based on the first current and a second current input from a battery to one ECU of the two ECUs.

Here, the detecting of the current concentration may include detecting the current concentration based on a ratio of the second current to the first current.

Here, the detecting of the current concentration may include determining whether current concentration occurs by comparing a sensed value which is an absolute value of a value obtained by dividing the first current by the second current with a preset reference value.

Here, the detecting of the current concentration may include determining that current concentration occurs when the sensed value is greater than the reference value and determining that current concentration does not occur when the sensed value is less than the reference value.

Here, the detecting of the current concentration may include, when it is determined that current concentration occurs, detecting which ECU of the two ECUs is subjected to the current concentration based on a sign of the first current.

Here, the detecting of the current concentration may include detecting the current concentration based on the second current and the first current only when a current flowing in the redundant system is greater than or equal to a preset reference current.

Here, the detecting of the current concentration may include, when it is determined that current concentration occurs, requesting a control output down of the redundant system to a central ECU of a vehicle equipped with the redundant system.

Here, the detecting of the current concentration may include, when it is determined that current concentration occurs, recording a diagnostic trouble code (DTC) in a vehicle equipped with the redundant system.

Here, the current sensor may include a resistor.

According to an apparatus and method for detecting current concentration of a redundant system according to a preferred example embodiment of the present disclosure, by detecting current concentration generated in a redundant system including two electronic control units (ECUs) using a common ground using a current sensor disposed on the common ground, it is possible to minimize occurrence of failures in the redundant system.

Effects of the present disclosure are not limited to the effects mentioned above, and other effects not mentioned will be clearly understood by those skilled in the art from the description below.

DETAILED DESCRIPTION

Figure 1:
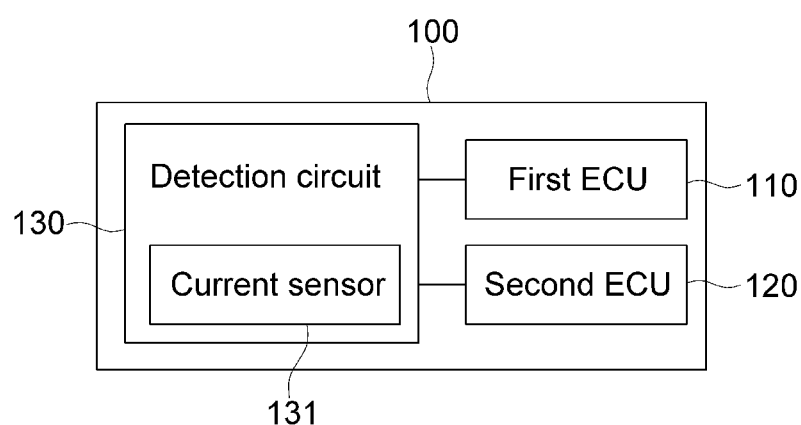
FIG. 1 is a block diagram for illustrating a current concentration detection apparatus of a redundant system according to a preferred embodiment of the present disclosure.

Hereinafter, example embodiments of the present disclosure will be described in detail with reference to the accompanying drawings. Advantages and features of embodiments disclosed herein, and methods for achieving them, will be clarified with reference to the example embodiments described below with the accompanying drawings. However, the present disclosure is not limited to the example embodiments disclosed below, but may be implemented in various different forms, and the example embodiments are provided merely to fully inform a person skilled in the art of the scope of the invention related to the present disclosure, and the present disclosure is only defined by the scope of the claims. Throughout the specification, like reference numerals refer to like components.

Unless otherwise defined, all terms (including technical and scientific terms) used in this specification may be used in a meaning commonly understood by those skilled in the art to which the present disclosure pertains. In addition, terms defined in dictionaries generally used are not construed ideally or excessively unless explicitly specifically defined.

In the present disclosure, terms such as "first" and "second" are used to distinguish one component from another component, and the scope of rights should not be limited by such terms. For example, a first component may be termed a second component, and similarly, a second component may be termed a first component.

In the present specification, in each step, identification symbols (e.g., a, b, c, etc.) are used for convenience of explanation, and the identification symbol does not describe the order of each step, and each step may occur in a different order from the specified order unless the specific order is clearly described in context. In other words, each step may occur in the same order as specified, may be performed substantially simultaneously, or may be performed in the reverse order.

In the present specification, expressions such as "have," "may have," "comprise" or "may comprise" indicate the presence of corresponding features (e.g., components such as numerical values, functions, operations, or parts), and do not exclude the presence of additional features.

In addition, the term '~ unit' described in the present specification means software or a hardware component such as a field-programmable gate array (FPGA) or ASIC, and a '~ unit' performs predetermined roles. However, the term '~ unit' is not limited to software or hardware. A '~ unit' may be configured to be in an addressable storage medium and may be configured to reproduce one or more processors. Therefore, as an example, the '~ unit' includes components such as software components, object-oriented software components, class components, and task components, processes, functions, properties, procedures, subroutines, segments of program code, drivers, firmware, microcode, circuitry, data structures and variables. Functions provided within components and '~ units' may be combined into smaller numbers of components and '~ units' or further separated into additional components and '~ units'.

Hereinafter, preferred example embodiments of an apparatus and method for detecting current concentration in a redundant system according to the present disclosure will be described in detail with reference to the accompanying drawings.

First, referring to FIGS. 1 to 3, a current concentration detection apparatus of a redundant system according to a preferred example embodiment of the present disclosure will be described.

Figure 2:
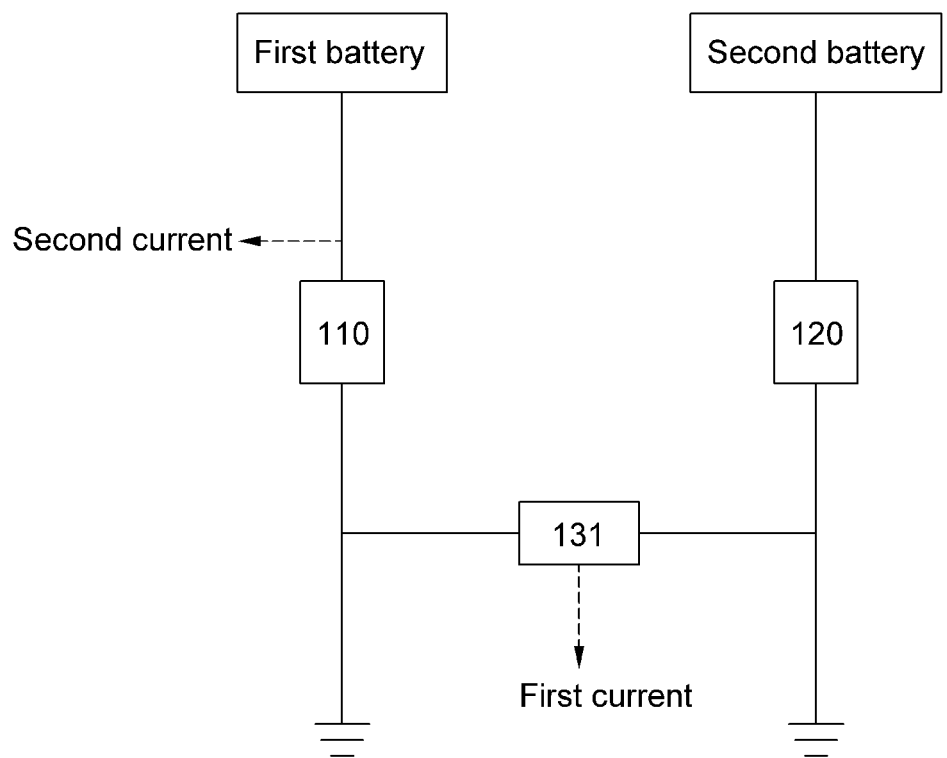
FIG. 2 is a diagram for illustrating a current concentration detection operation according to a preferred example embodiment of the present disclosure.
Figure 3:
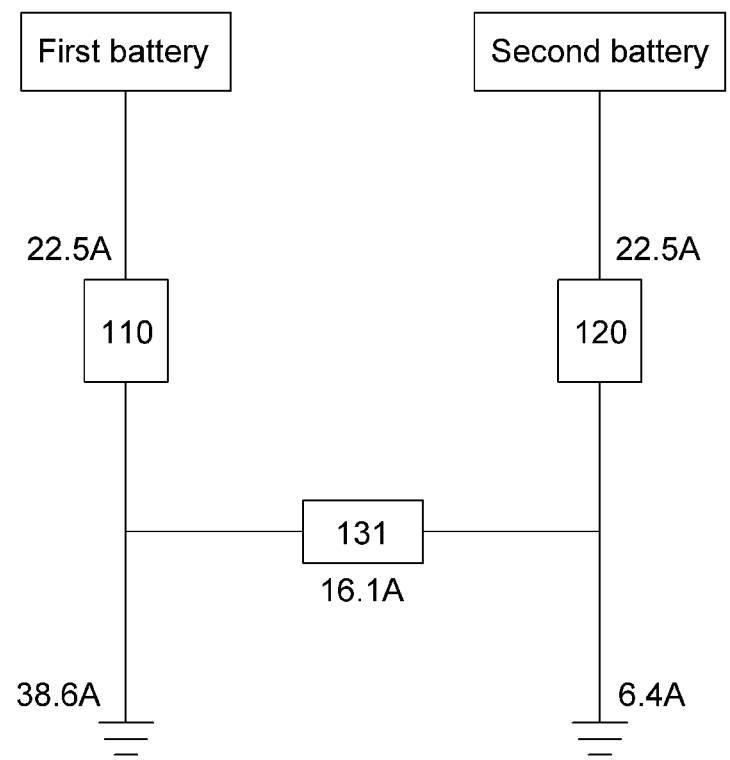
FIG. 3 is a diagram for illustrating an example of a current concentration detection operation according to a preferred example embodiment of the present disclosure.

FIG. 1 is a block diagram for illustrating a current concentration detection apparatus of a redundant system according to a preferred embodiment of the present disclosure, FIG. 2 is a diagram for illustrating a current concentration detection operation according to a preferred example embodiment of the present disclosure, and FIG. 3 is a diagram for illustrating an example of a current concentration detection operation according to a preferred example embodiment of the present disclosure.

Referring to FIG. 1, a current concentration detection apparatus 100 of a redundant system according to a preferred example embodiment of the present disclosure may detect current concentration generated in a redundant system using a current sensor mounted on the redundant system including two electronic control units (ECUs) using a common ground and disposed on the common ground.

Here, the redundant system refers to a system mounted on a vehicle to perform various functions. For example, the redundant system includes electric power steering (EPS), electronic stability control (ESC), brake assist system (BAS), adaptive cruise control (ACC), traction control system (TCS), and the like.

To this end, the current concentration detection apparatus 100 may include a first ECU 110 and a second ECU 120, which are two ECUs that use a common ground, and a detection circuit 130.

The detection circuit 130 includes a current sensor 131 disposed on a common ground, and may detect current concentration based on a first current sensed through the current sensor 131.

Here, the current sensor 131 may include a resistor. For example, the current sensor 131 may include an operational amplifier (OP Amp) and the like.

In other words, the detection circuit 130 may detect current concentration based on the first current and the second current input from the battery to one ECU of the two ECUs 110 and 120. Since the reason for implementing a redundant system is to perform a normal operation even if a failure occurs, the same control command is input to the two ECUs 110 and 120 of the redundant system. For example, if the total current input to the redundant system is "10", current "5" is input to the first ECU 110, and current "5" is similarly input to the second ECU 120. Accordingly, the detection circuit 130 may detect current concentration by using the second current input from the battery to the first ECU 110 or the second current input from the battery to the second ECU 120.

Referring to FIG. 2, the detection circuit 130 may detect whether current is concentrated on the first ECU 110 or on the second ECU 120 between the two ECUs 110 and 120 and a common ground, based on a second current input from the first battery to the first ECU 110 or a second current input from the second battery to the second ECU 120, and a first current sensed through the current sensor 131 disposed on the common ground of the first ECU 110 and the second ECU 120.

More specifically, the detection circuit 130 may detect current concentration based on the ratio of the first current to the second current.

In addition, the detection circuit 130 may compare the sensed value which is an absolute value of the value obtained by dividing the first current by the second current as shown in [Equation 1], with a preset reference value to determine whether current concentration occurs.

$$\text{Sensed value} = \text{abs}(\text{first current}/\text{second current}) \quad [\text{Equation 1}]$$

Here, the reference value is a threshold value used to determine whether current concentration occurs, and may be set in advance. For example, when it is determined that current concentration occurs when the current ratio is "6:1" or more, the reference value may be set to "5/7" calculated based on the current ratio "6:1".

At this time, if the sensed value is greater than the reference value, the detection circuit 130 may determine that current concentration occurs. Here, when it is determined that current concentration occurs, the detection circuit 130 may detect which ECU of the two ECUs is subjected to current concentration based on a sign of the first current. For example, when the current sensor 131 consists of the OP Amp, the sign of the output voltage changes depending on the +/− input direction of the OP amp, and the detection circuit 130 may detect whether current is concentrated on the first ECU 110 or on the second ECU 120 through the sign of the first current sensed through the OP amp.

On the other hand, if the sensed value is smaller than the reference value, the detection circuit 130 may determine that current concentration does not occur.

For example, as shown in FIG. 3, when the first current is "16.1 A" and the second current is sensed as "22.5 A", the detection circuit 120 may detect that current is being concentrated on the first ECU 110 since the sensed value "0.72" obtained based on the first current "16.1 A" and the second current "22.5 A" is greater than the reference value "5/7=0.71".

Meanwhile, the detection circuit 130 may detect current concentration based on the second current and the first current only when the current flowing through the redundant system is greater than or equal to a preset reference current. Here, the reference current is a threshold value used to determine whether the current concentration detection operation is performed, and may be set in advance. For example, in a situation where the redundant system is "EPS system" and the maximum allowable current of the redundant system is "90 A", the detection circuit 130 may perform the current concentration detection operation only when the total current currently flowing in the redundant system is greater than or equal to "50% of the maximum allowable current=45 A" which is the reference current. Since there is no risk of affecting the redundant system or causing a fire if the total current flowing in the redundant system is small, the current concentration detection operation may be performed only when a current higher than a certain condition flows through the redundant system.

In addition, the detection circuit 130 may perform a corresponding operation when it is determined that current concentration occurs. In other words, when it is determined that current concentration occurs, the detection circuit 130 may request a control output down of the redundant system to a central ECU of a vehicle equipped with the redundant system. In addition, when it is determined that current concentration occurs, the detection circuit 130 may record the diagnostic trouble code (DTC) in the vehicle equipped with the redundant system. In addition, when it is determined that current concentration occurs, the detection circuit 130 may warn the driver of the related content by turning on a warning light of the vehicle equipped with the redundant system.

Then, referring to FIG. 4, a current concentration detection method of a redundant system according to a preferred example embodiment of the present disclosure will be described.

Figure 4:
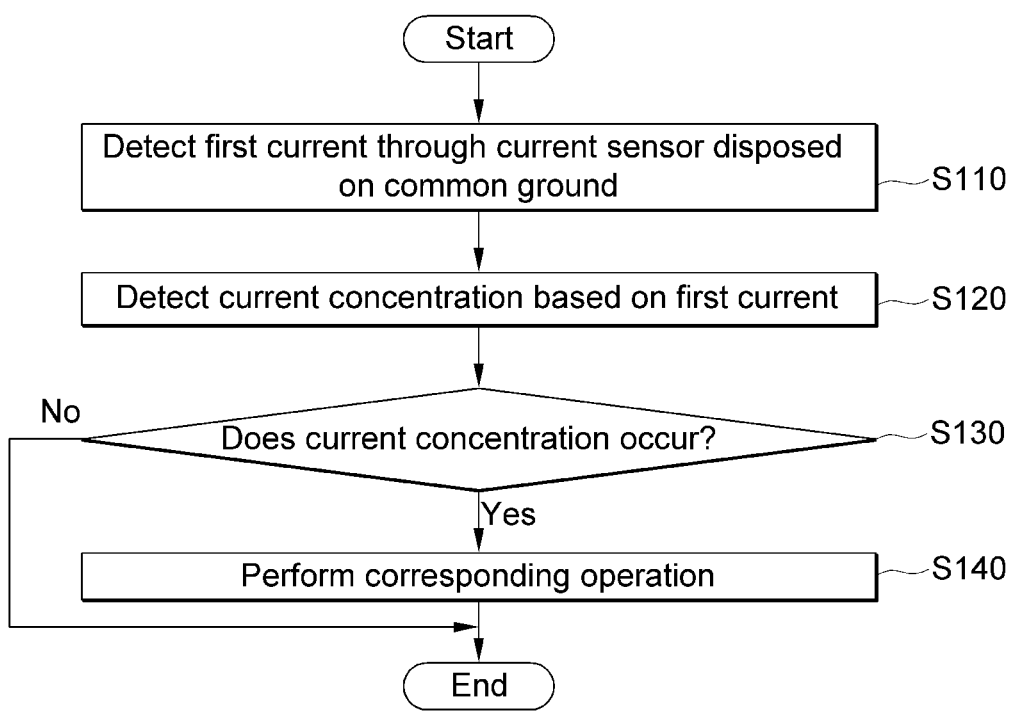
FIG. 4 is a block diagram for illustrating a current concentration detection method of a redundant system according to a preferred embodiment of the present disclosure.

FIG. 4 is a block diagram for illustrating a current concentration detection method of a redundant system according to a preferred embodiment of the present disclosure.

Referring to FIG. 4, the detection circuit 130 of the current concentration detection apparatus 100 may detect the first current through the current sensor 131 disposed on the common ground (S110).

Then, the detection circuit 130 may detect current concentration based on the first current (S120).

In other words, the detection circuit 130 may detect current concentration based on the first current and the second current input from the battery to one ECU of the two ECUs 110 and 120.

More specifically, the detection circuit 130 may detect current concentration based on the ratio of the first current to the second current.

In addition, the detection circuit 130 may compare the sensed value which is an absolute value of the value obtained by dividing the first current by the second current as shown in [Equation 1], with a preset reference value to determine whether current concentration occurs.

At this time, if the sensed value is greater than the reference value, the detection circuit 130 may determine that current concentration occurs. Here, when it is determined that current concentration occurs, the detection circuit 130 may detect which ECU of the two ECUs is subjected to current concentration based on a sign of the first current.

On the other hand, if the sensed value is smaller than the reference value, the detection circuit 130 may determine that current concentration does not occur.

Thereafter, when it is determined that current concentration occurs (S130—Y), the detection circuit 130 may perform a corresponding operation (S140).

In other words, when it is determined that current concentration occurs, the detection circuit 130 may request a control output down of the redundant system to a central ECU of a vehicle equipped with the redundant system. In addition, when it is determined that current concentration occurs, the detection circuit 130 may record the DTC in the vehicle equipped with the redundant system. In addition, when it is determined that current concentration occurs, the detection circuit 130 may warn the driver of the related content by turning on the warning light of the vehicle equipped with the redundant system.

Meanwhile, the detection circuit 130 may detect current concentration based on the second current and the first current only when the current flowing through the redundant system is greater than or equal to a preset reference current.

Even though all components constituting the example embodiments of the present disclosure described above are described as being combined or operated as one, the present disclosure is not necessarily limited to these example embodiments. In other words, within the scope of the object of the present disclosure, all of the components may be selectively combined with one or more to operate. In addition, although all of the components can be implemented as independent hardware, some or all of the components may be selectively combined and implemented as a computer program having program modules that perform some or all of the combined functions in one or a plurality of hardware. In addition, such a computer program can implement an example embodiment of the present disclosure by being stored in a non-transitory computer readable medium such as a USB memory, a CD disk, a flash memory, etc., and read and executed by a computer. A non-transitory recording medium of a computer program may include a magnetic recording medium, an optical recording medium, and the like.

The above description is merely illustrative of the technical idea of the present disclosure, and those skilled in the art to which the present disclosure pertains may make various modifications, changes, and substitutions without departing from the essential characteristics of the present disclosure. Accordingly, the example embodiments disclosed in the present disclosure and the accompanying drawings are not intended to limit the technical idea of the present disclosure but to explain, and the scope of the technical idea of the present disclosure is not limited by these example embodiments and the accompanying drawings. The protection scope of the present disclosure should be construed according to the following claims, and all technical ideas within the equivalent range should be construed as being included in the scope of the present disclosure.

What is claimed is:

1. An apparatus for detecting current concentration of a redundant system, the apparatus comprising:
   two electronic control units (ECUs) using a common ground; and
   a detection circuit which comprises a current sensor disposed on the common ground and is configured to detect current concentration based on a first current sensed through the current sensor only when a current flowing in the redundant system is greater than or equal to a preset reference current,
   wherein the detection circuit is configured to detect current concentration based on the first current and a second current input from a battery to one ECU of the two ECUs, and
   wherein the detection circuit is configured to, when it is determined that current concentration occurs, record a diagnostic trouble code (DTC) in a vehicle equipped with the redundant system.

2. The apparatus of claim 1, wherein the detection circuit is configured to detect the current concentration based on a ratio of the second current to the first current.

3. The apparatus of claim 2, wherein the detection circuit is configured to determine whether current concentration occurs by comparing a sensed value which is an absolute value of a value obtained by dividing the first current by the second current with a preset reference value.

4. The apparatus of claim 3, wherein the detection circuit is configured to determine that current concentration occurs when the sensed value is greater than the reference value, and determine that current concentration does not occur when the sensed value is less than the reference value.

5. The apparatus of claim 4, wherein the detection circuit is configured to, when it is determined that current concentration occurs, detect which ECU of the two ECUs is subjected to the current concentration based on a sign of the first current.

6. The apparatus of claim 1, wherein the detection circuit is configured to detect the current concentration based on the second current and the first current only when a current flowing in the redundant system is greater than or equal to the preset reference current.

7. The apparatus of claim 1, wherein the detection circuit is configured to, when it is determined that current concentration occurs, request a control output down of the redundant system to a central ECU of a vehicle equipped with the redundant system.

8. The apparatus of claim 1, wherein the current sensor comprises a resistor.

9. A method for detecting current concentration of a redundant system comprising two electronic control units (ECUs) using a common ground and a detection circuit, the method comprising:
   sensing, by the detection circuit, a first current through a current sensor disposed on the common ground; and
   detecting, by the detection circuit, current concentration based on the first current only when a current flowing in the redundant system is greater than or equal to a preset reference current,
   wherein the detecting of the current concentration comprises detecting current concentration based on the first current and a second current input from a battery to one ECU of the two ECUs, and
   wherein the detecting of the current concentration comprises, when it is determined that current concentration occurs, recording a diagnostic trouble code (DTC) in a vehicle equipped with the redundant system.

10. The method of claim 9, wherein the detecting of the current concentration comprises detecting the current concentration based on a ratio of the second current to the first current.

11. The method of claim 10, wherein the detecting of the current concentration comprises determining whether current concentration occurs by comparing a sensed value which is an absolute value of a value obtained by dividing the first current by the second current with a preset reference value.

12. The method of claim 11, wherein the detecting of the current concentration comprises determining that current concentration occurs when the sensed value is greater than the reference value and determining that current concentration does not occur when the sensed value is less than the reference value.

13. The method of claim 12, wherein the detecting of the current concentration comprises, when it is determined that current concentration occurs, detecting which ECU of the two ECUs is subjected to the current concentration based on a sign of the first current.

14. The method of claim 9, wherein the detecting of the current concentration comprises detecting the current concentration based on the second current and the first current only when a current flowing in the redundant system is greater than or equal to the preset reference current.

15. The method of claim 9, wherein the detecting of the current concentration comprises, when it is determined that current concentration occurs, requesting a control output down of the redundant system to a central ECU of a vehicle equipped with the redundant system.

16. The method of claim 9, wherein the current sensor comprises a resistor.

\* \* \* \* \*